(12) United States Patent
Lee et al.

(10) Patent No.: US 12,451,544 B2
(45) Date of Patent: Oct. 21, 2025

(54) BATTERY PACK INCLUDING HEATING MEMBER

(71) Applicant: LG Chem, Ltd., Seoul (KR)

(72) Inventors: Jong Cheol Lee, Daejeon (KR); Geun Hoe Huh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 585 days.

(21) Appl. No.: 17/270,756

(22) PCT Filed: Jun. 26, 2020

(86) PCT No.: PCT/KR2020/008377
§ 371 (c)(1),
(2) Date: Feb. 23, 2021

(87) PCT Pub. No.: WO2021/025293
PCT Pub. Date: Feb. 11, 2021

(65) Prior Publication Data
US 2021/0184296 A1    Jun. 17, 2021

(30) Foreign Application Priority Data
Aug. 8, 2019 (KR) .......................... 10-2019-0096973

(51) Int. Cl.
*H01M 10/6571* (2014.01)
*H01M 10/48* (2006.01)
(Continued)

(52) U.S. Cl.
CPC ..... *H01M 10/6571* (2015.04); *H01M 10/486* (2013.01); *H01M 10/615* (2015.04);
(Continued)

(58) Field of Classification Search
CPC ............. H01M 10/6571; H01M 50/20; H01M 50/204; H01M 50/207; H01M 50/209;
(Continued)

(56) References Cited

U.S. PATENT DOCUMENTS 3,527,925 A * 9/1970 Takeo ...................... H05B 3/00
219/544
2010/0151309 A1    6/2010 Marukawa et al.
(Continued)

FOREIGN PATENT DOCUMENTS

CN    103443523 A    12/2013
JP    H09190840 A    7/1997
(Continued)

OTHER PUBLICATIONS

International Search Report for Application No. PCT/KR2020/008377, dated Sep. 25, 2020, 2 pages.
(Continued)

*Primary Examiner* — Amanda J Barrow
(74) *Attorney, Agent, or Firm* — Lerner David LLP

(57) ABSTRACT

A battery pack capable of inhibiting the occurrence of temperature deviations between battery cells in a battery cell stack includes a battery cell stack having a plurality of battery cells stacked in tight contact with each other; a heating member disposed along and in contact with three outer surfaces of the battery cell stack; a temperature sensor connected to each of the battery cells; and a battery pack case configured to receive the battery cell stack, the heating member, and the temperature sensors. The heating member has a structure including a first surface, a second surface, and a third surface.

6 Claims, 7 Drawing Sheets

(51) Int. Cl.
*H01M 10/615* (2014.01)
*H01M 10/617* (2014.01)
*H01M 10/647* (2014.01)
*H01M 10/653* (2014.01)
*H01M 10/658* (2014.01)
*H01M 50/209* (2021.01)

(52) U.S. Cl.
CPC ....... *H01M 10/617* (2015.04); *H01M 10/647* (2015.04); *H01M 10/653* (2015.04); *H01M 10/658* (2015.04); *H01M 50/209* (2021.01)

(58) Field of Classification Search
CPC ............. H01M 50/211; H01M 50/216; H01M 10/615; H01M 10/617
See application file for complete search history.

(56) References Cited

U.S. PATENT DOCUMENTS

| | | | |
|---|---|---|---|
| 2013/0236753 A1 | 9/2013 | Yue et al. | |
| 2013/0344369 A1 | 12/2013 | Miyakawa et al. | |
| 2017/0025725 A1* | 1/2017 | Shepherd | H01M 10/6557 |
| 2017/0117725 A1* | 4/2017 | Hendricks | G01K 1/026 |
| 2018/0090949 A1 | 3/2018 | Lim et al. | |
| 2018/0241092 A1* | 8/2018 | Goitsuka | A62C 35/10 |
| 2018/0241104 A1* | 8/2018 | Yamashita | H01M 10/615 |
| 2019/0013556 A1* | 1/2019 | Sakaguchi | H01M 50/124 |
| 2019/0058352 A1* | 2/2019 | Gow | G06F 11/3058 |
| 2019/0067762 A1* | 2/2019 | Zhang | H01M 10/647 |
| 2019/0131596 A1* | 5/2019 | Yang | H01M 50/224 |
| 2020/0220128 A1 | 7/2020 | Kim et al. | |
| 2022/0131207 A1* | 4/2022 | Ahn | H01M 50/211 |

FOREIGN PATENT DOCUMENTS

| | | | | |
|---|---|---|---|---|
| JP | 3131704 U | | 5/2007 | |
| JP | 2007213939 A | | 8/2007 | |
| JP | 2010146777 A | | 7/2010 | |
| JP | 2013073773 A | | 4/2013 | |
| JP | 2014-183013 | * | 9/2014 | ........... H01M 10/39 |
| JP | 2014183013 A | | 9/2014 | |
| JP | 2015022915 A | | 2/2015 | |
| JP | 2017195049 A | | 10/2017 | |
| KR | 20120053476 A | | 5/2012 | |
| KR | 20130104660 A | | 9/2013 | |
| KR | 20180032785 A | | 4/2018 | |
| KR | 10-2018-0085123 | * | 7/2018 | ........... H01M 10/63 |
| KR | 20180085123 A | | 7/2018 | |
| KR | 20190012059 A | | 2/2019 | |
| KR | 20190064835 A | | 6/2019 | |
| WO | 2013065285 A1 | | 5/2013 | |
| WO | WO-2018160829 A1 | * | 9/2018 | |

OTHER PUBLICATIONS

Search Report for European Application No. 20841854.1 dated Aug. 19, 2021. 2 pgs.

* cited by examiner

【FIG. 1】
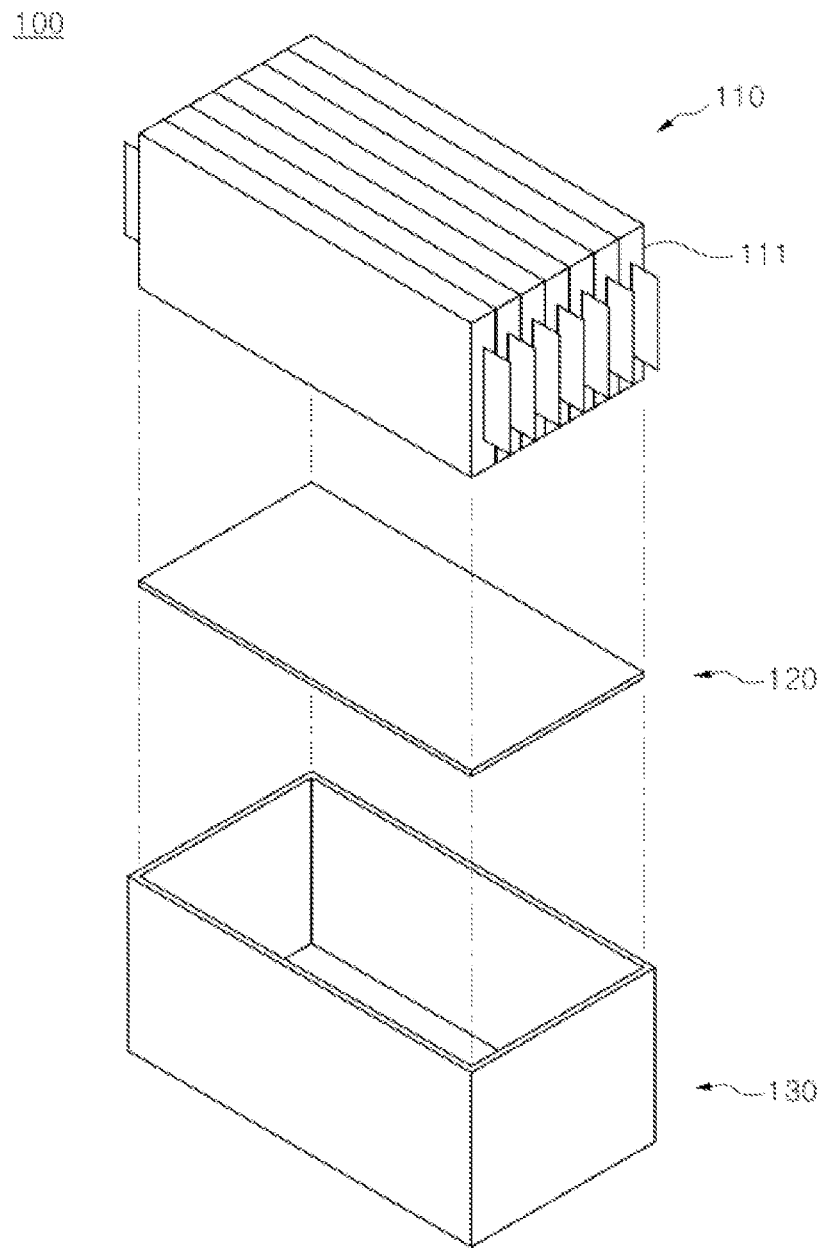

[FIG. 2]
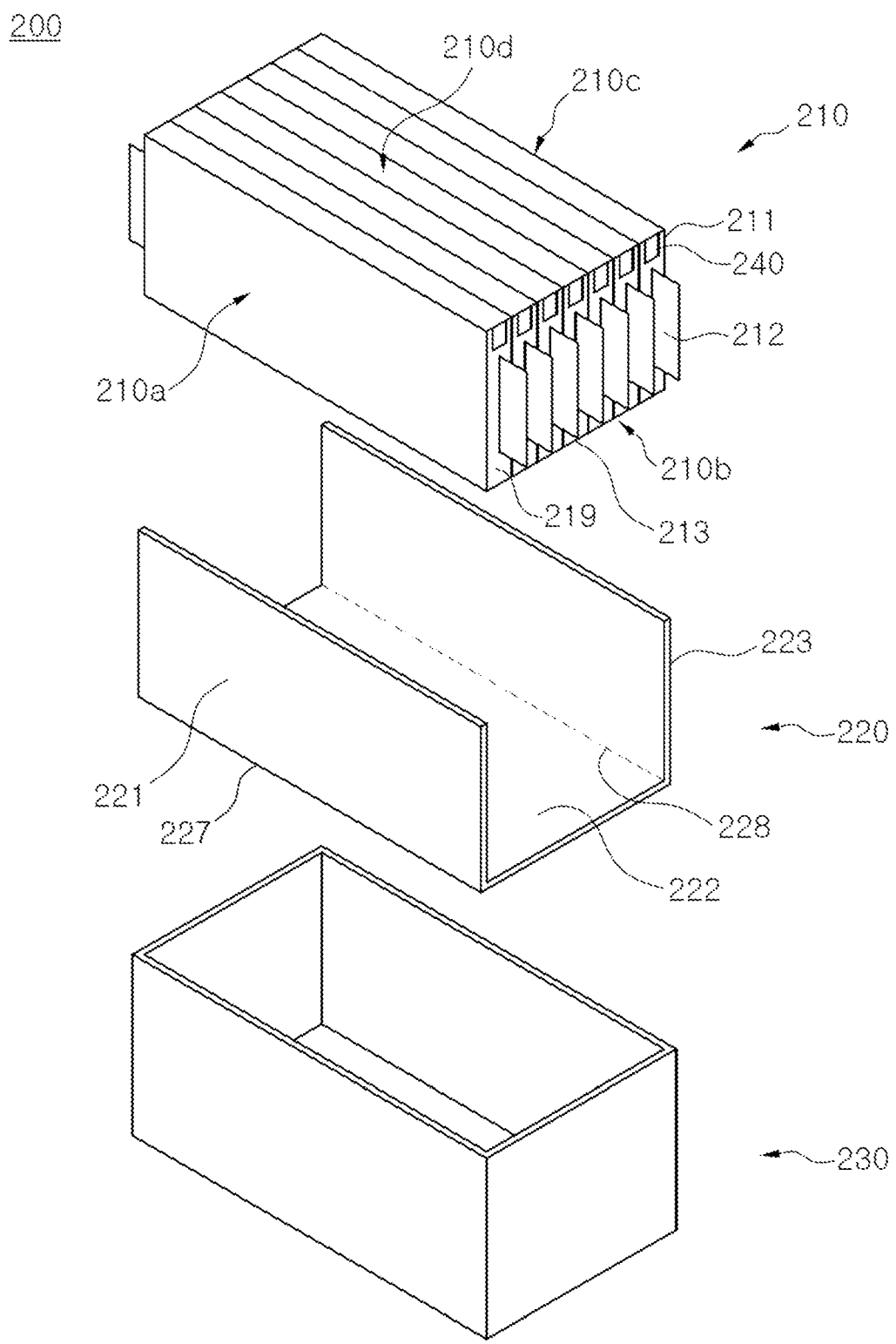

[FIG. 3]
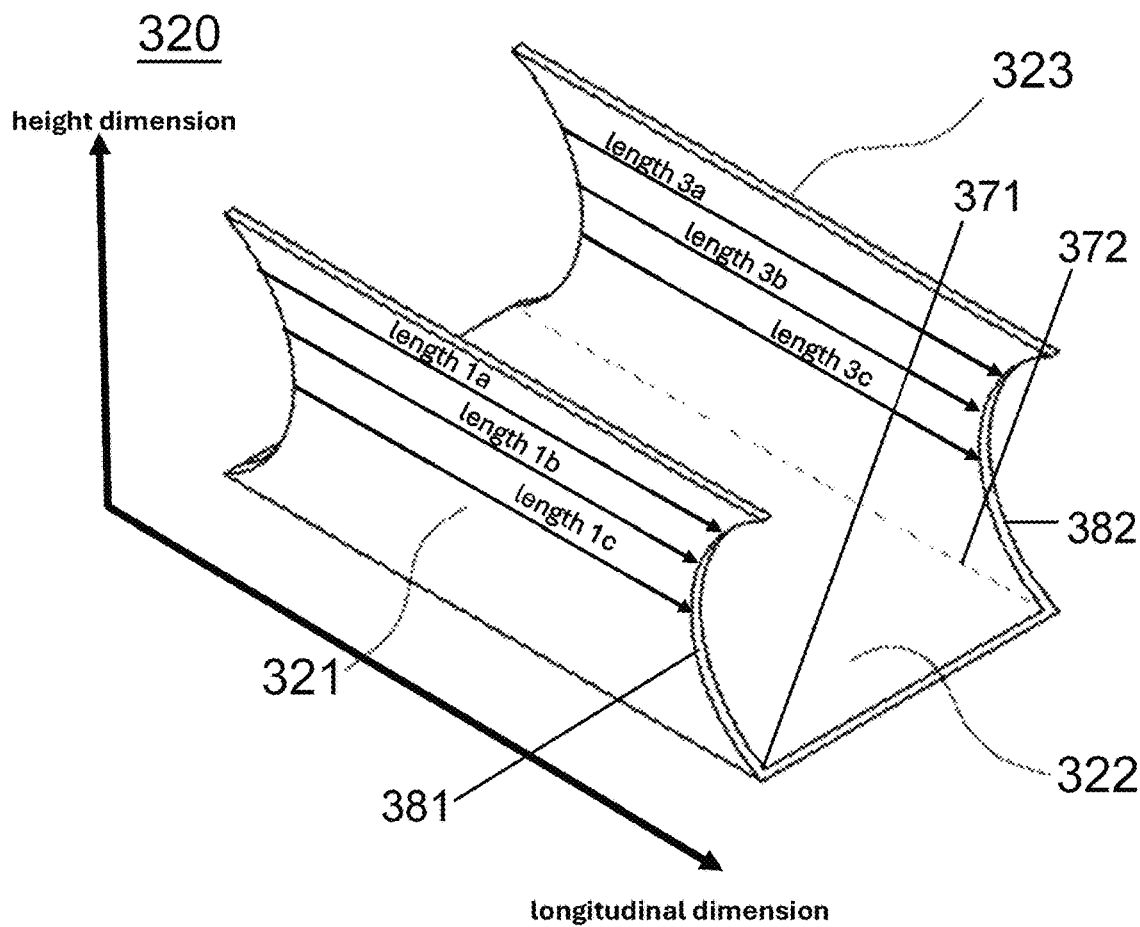
[FIG. 4]
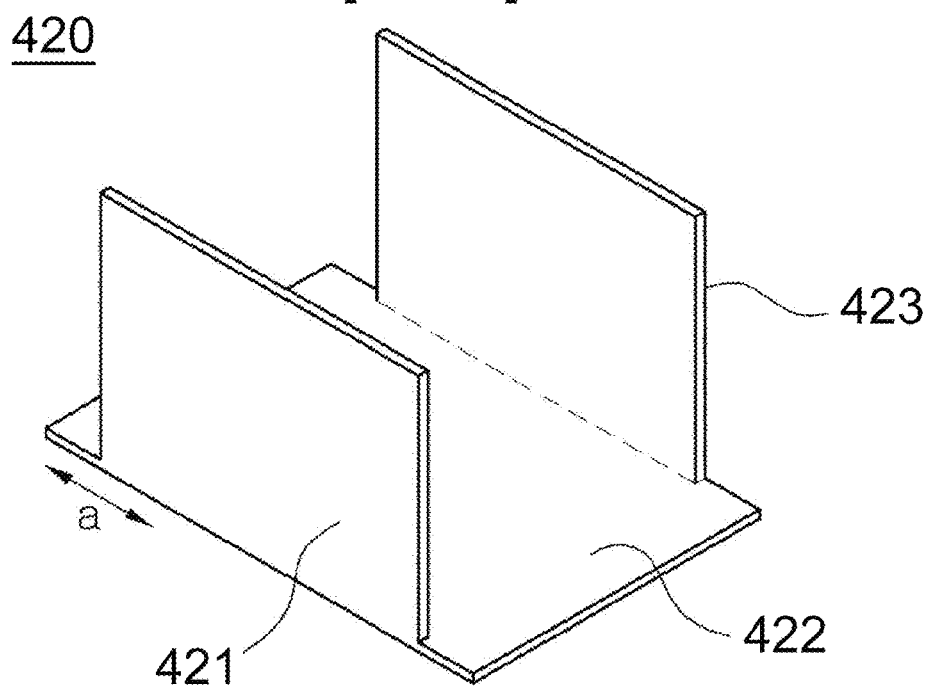

[FIG. 5]
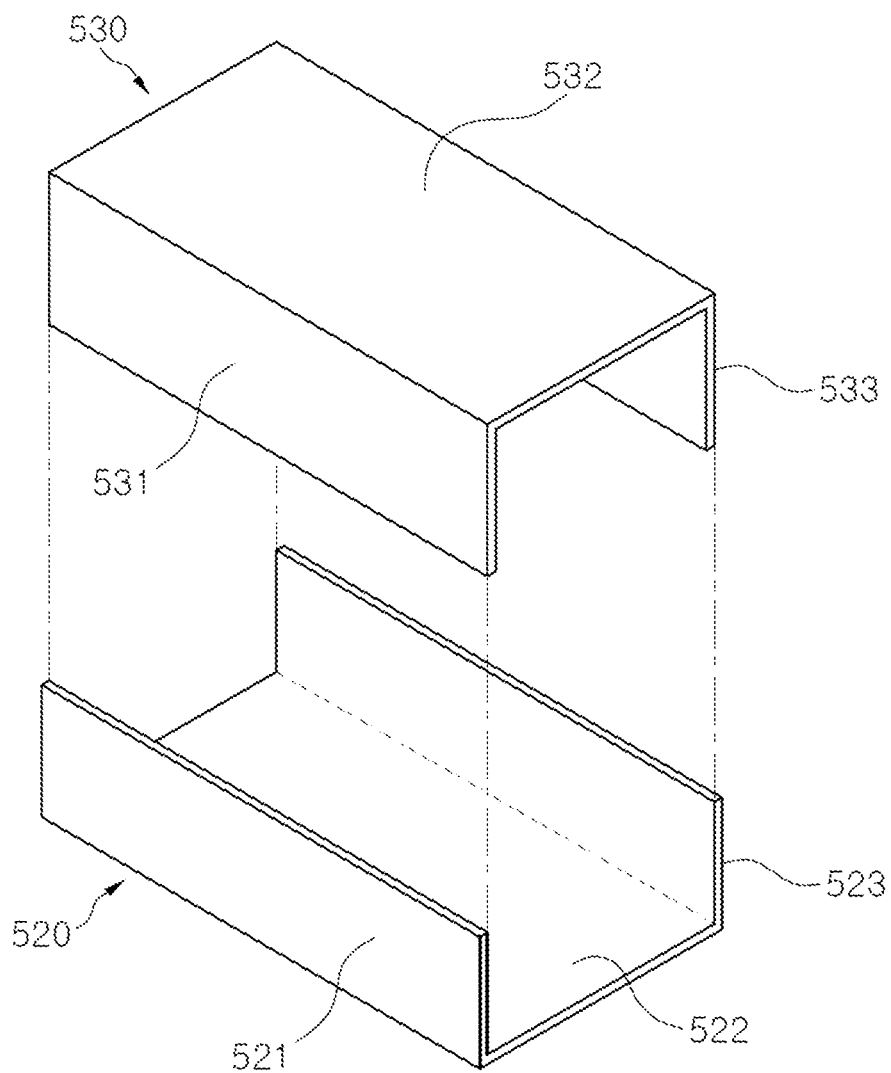

[FIG. 6]
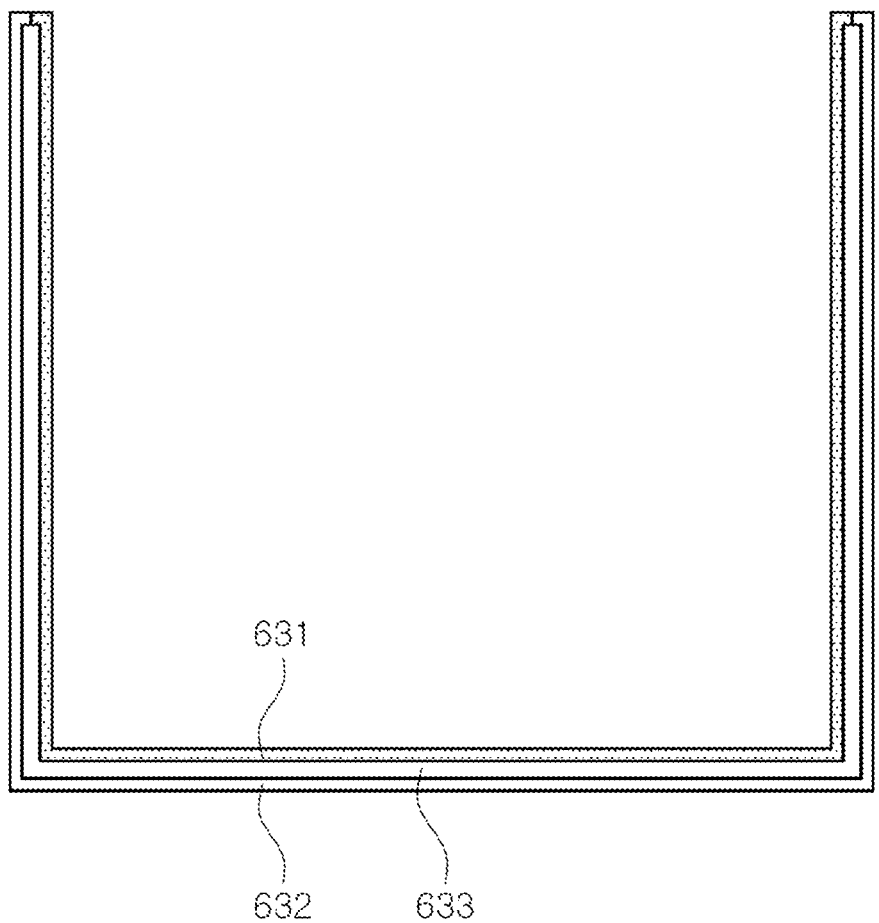

[FIG. 7]
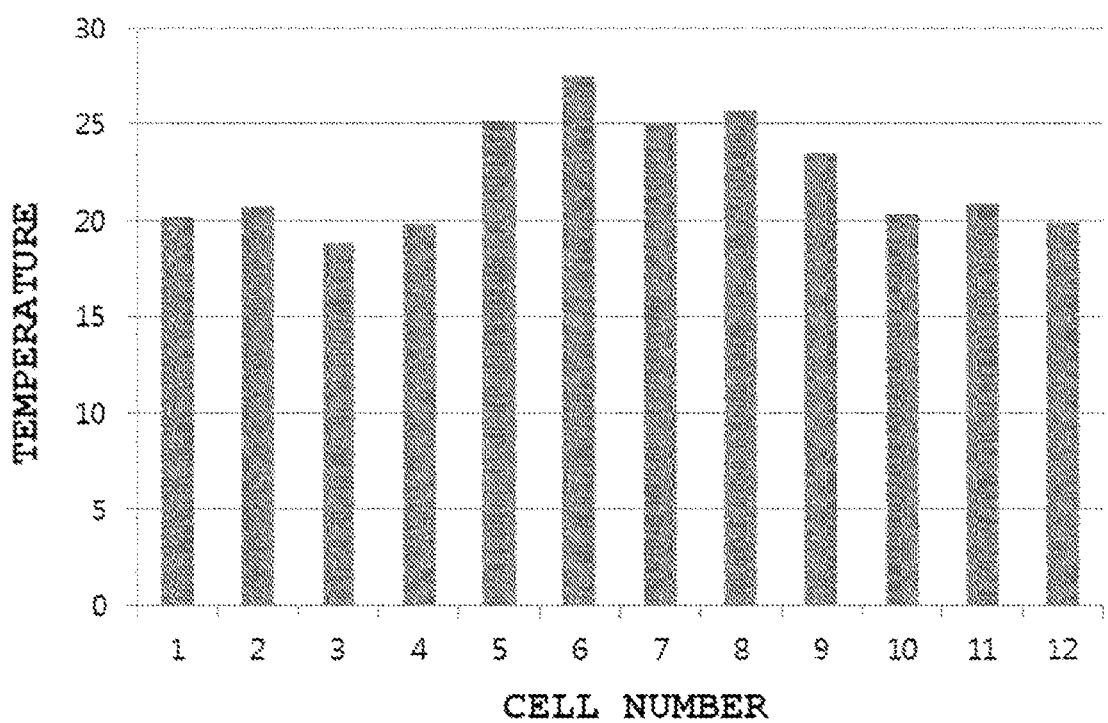

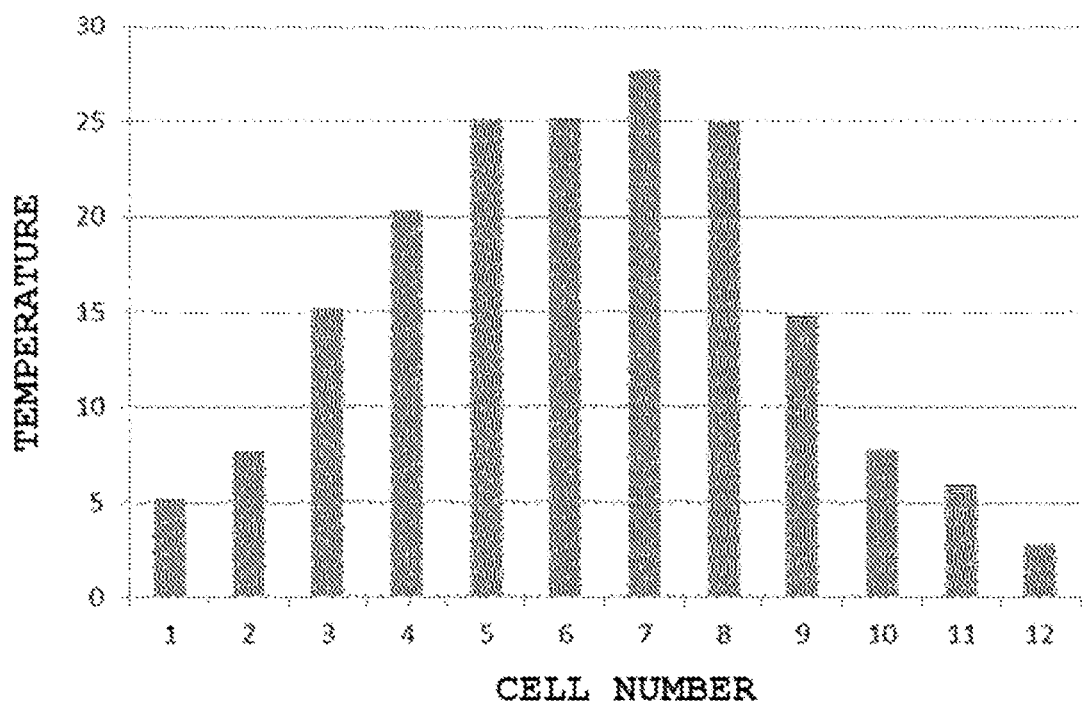
【FIG. 8】

BATTERY PACK INCLUDING HEATING MEMBER

CROSS-REFERENCE TO RELATED APPLICATIONS

This application is a national phase entry under U.S.C. § 371 of International Application No. PCT/KR2020/008377 filed on Jun. 26, 2020, which claims priority to Korean Patent Application No. 2019-0096973 filed on Aug. 8, 2019, the disclosure of which is hereby incorporated herein by reference in its entirety.

TECHNICAL FIELD

The present invention relates to a battery pack including a heating member, and more particularly to a battery pack including a heating member disposed along three of the outer surfaces of a battery cell stack in the state of being in tight contact therewith in order to reduce temperature deviation of the battery cell stack.

BACKGROUND ART

As existing gasoline and diesel vehicles using fossil fuels are considered to be main air pollution sources, an electric vehicle, a hybrid electric vehicle, and a plug-in hybrid electric vehicle have attracted considerable attention as alternatives thereto, and research and development of secondary batteries as energy sources therefor have been actively conducted.

A secondary battery used in a device that requires large capacity and high voltage, such as the electric vehicle, is used in the form of a battery cell assembly or a battery pack having a structure in which a plurality of battery cells is arranged.

The battery cell assembly or the battery pack may be affected by various environments in which the device is operated. For example, the charge capacity and output of the battery pack may greatly vary depending on temperature.

Specifically, when comparing the case in which a battery pack including a lithium secondary battery is charged at a sub-zero temperature and the case in which the battery pack is charged at an above-zero temperature so as to have the same charge capacity, the battery pack charged at the sub-zero temperature requires a longer charge time than the battery pack charged at the above-zero temperature, since the charge capacity of the battery pack charged at the sub-zero temperature is considerably limited due to the low temperature.

In order to maintain the temperature of the battery pack at a predetermined level or higher, therefore, various attempts, such as addition of a heating pad to the interior of the battery pack, have been performed.

FIG. 1 is an exploded perspective view schematically showing a battery pack including a conventional heating member.

Referring to FIG. 1, the battery pack 100 includes a battery cell stack 110 configured to have a structure in which a plurality of battery cells 111 is arranged so as to be in tight contact with each other, a heating member 120 located at the lower part of the battery cell stack 110, and a battery pack case 130 configured to receive the battery cell stack 110 and the heating member 120.

The heating member 120 is applied to the lower surface of the battery cell stack 110 received in the battery pack case 130, and the battery cell stack 110 may be heated from the lower part of the battery cell stack 110.

However, the heating member 120 is flat, and therefore the heating member 120 is in contact with only the lower surface of the battery cell stack 110. As a result, time necessary to increase overall temperature of the battery cell stack 110 is increased.

In addition, heat is easily discharged from the battery cells located at the outside parts of the battery cell stack 110, since the battery cells are in tight contact with the battery pack case 130, which is made of a metal material. In contrast, temperatures of the battery cells located at the middle part of the battery cell stack 110 are more rapidly increased, since the battery cells, each of which has properties of a heating element, are arranged in the state of being in tight contact with each other. As a result, temperature deviation between individual battery cells is increased.

This causes deviation in charge capacity between the battery cells and also causes lifespan differences between individual battery cells.

Meanwhile, Patent Document 1 discloses a battery assembly configured such that heat dissipation and heat generation films including a carbon nanotube heating element are included in a battery module and/or a sheathing case, wherein the heat dissipation film includes first and second heat dissipation layers, each of which is made of a thermally conductive material, each of the first and second heat dissipation layers being configured to dissipate heat from a unit cell, and an adhesive layer formed between the first and second heat dissipation layers, the adhesive layer being configured to adhere the first and second heat dissipation layers to each other. Patent Document 1 specifically suggests the structure of the heat dissipation film but does not suggest a method of reducing temperature deviation between battery cells.

Patent Document 2 discloses a battery pack configured to have a structure in which a heating pad is inserted into a cell module assembly including a plurality of battery cells while the cell module assembly is filled with insulation foam, the operation of the heating pad is controlled such that the battery pack can be stably used even in the case in which the temperature condition in the environment in which the battery pack is used deviates from a guaranteed temperature range of the battery cells. In order to increase the temperature of the battery pack, the insulation foam is used in addition to the heating pad.

Patent Document 3 discloses a pack battery including an inner case configured to receive a plurality of batteries so as to be parallel to each other, an outer case configured to receive the inner case, a sheet heater disposed between the inner case and the outer case, the sheet heater being configured to increase the temperatures of the batteries. In the sheet heater, a resistance wire is fixed to a flexible insulative sheet. In the sheet heater, the resistance wire is bent along corners of the inner case and is fixed to two surfaces of the inner case. In the sheet heater, the bent portions of the resistance wire located at the corners of the inner case are fixed to the insulative sheet in the form of a curve, such as a convex shape or a concave shape, extending in a direction toward the bent wire.

As described above, the prior art documents use the heat dissipation film, the heating pad, and the sheet heater in order to increase the temperature in the battery pack. However, none of the prior art documents suggests a solution for solving a problem of nonuniform temperature distribution of a battery cell stack constituting the battery pack.

Therefore, there is a need for technology capable of solving the above problem.

PRIOR ART DOCUMENTS (Patent Document 1) Korean Patent Application Publication No. 2012-0053476 (2012.05.25)
(Patent Document 2) Korean Patent Application Publication No. 2018-0085123 (2018.07.26)
(Patent Document 3) Japanese Patent Application Publication No. 2007-213939 (2007.08.23)

DISCLOSURE

Technical Problem

The present invention has been made in view of the above problems, and it is an object of the present invention to provide a battery pack including a heating member disposed so as to wrap the outer surface of a battery cell stack having a structure in which a plurality of battery cells is stacked so as to be in tight contact with each other in order to reduce temperature deviation between the battery cells.

Technical Solution

In order to accomplish the above objects, a battery pack according to the present invention includes a battery cell stack configured to have a structure in which a plurality of battery cells is stacked so as to be in tight contact with each other; a heating member disposed along and in tight contact with three of the outer surfaces of the battery cell stack; and a battery pack case configured to receive the battery cell stack and the heating member, wherein the heating member is configured to have an integrated structure including a first surface, a second surface, and a third surface.

The heating member may generate heat using energy supplied from an external power source.

The battery cell stack may be configured such that side surfaces of reception portions of the plurality of pouch-shaped battery cells are disposed parallel to the ground in the state in which the reception portions are stacked so as to face each other.

A first bent portion may be formed between the first surface and the second surface of the heating member, a second bent portion may be formed between the second surface and the third surface of the heating member, and the first surface and the third surface may be located at outer surfaces of a first battery cell and a second battery cell, respectively, located at the outermost ends of the battery cell stack.

The area of the second surface of the heating member may be equal to the area of a facing outer surface of the battery cell stack.

The heating member may be configured in a form in which a portion of each of the first surface and the third surface of the heating member adjacent to a corresponding electrode tab is at least partially removed.

The heating member may include a metal or nonmetal resistance heating element.

The heating member may be configured in a form in which the resistance heating element is received in an insulative pad.

The insulative pad may include a first surface formed so as to face the battery cell stack and a second surface formed so as to face the battery pack case, the first surface of the insulative pad may be made of a material that exhibits high thermal conductivity, and the second surface of the insulative pad may be made of a material that exhibits high thermal insulation.

The heating member may be a first heating member, and the battery pack may further include a second heating member disposed so as to be symmetric with the first heating member in a direction opposite the first heating member, the second heating member being disposed at the outer surfaces of the battery cell stack so as to be attached thereto.

A temperature sensor may be connected to each of the battery cells, and the battery pack may further include an adjustment member configured to adjust heat generation temperature of the heating member based on the temperature of each individual battery cell measured by the temperature sensor.

The temperature of a battery cell having the highest temperature in the battery cell stack may be less than 1.5 times the temperature of battery cell having a lowest temperature.

The present invention may provide a device including the battery pack as a power source.

DESCRIPTION OF DRAWINGS

FIG. 1 is an exploded perspective view showing a battery pack including a conventional heating member.
FIG. 2 is an exploded perspective view showing a battery pack including a heating member according to a first embodiment of the present invention.
FIG. 3 is a perspective view showing a heating member according to a second embodiment of the present invention.
FIG. 4 is a perspective view showing a heating member according to a third embodiment of the present invention.
FIG. 5 is a perspective view showing a heating member according to a fourth embodiment of the present invention.
FIG. 6 is a sectional view showing a heating member according to a fifth embodiment of the present invention.
FIG. 7 is a graph showing temperature distribution of battery cells in a battery pack manufactured according to an example.
FIG. 8 is a graph showing temperature distribution of battery cells in a battery pack manufactured according to a comparative example.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, embodiments of the present invention will be described in detail with reference to the accompanying drawings.

FIG. 2 is an exploded perspective view showing a battery pack including a heating member according to a first embodiment of the present invention.

Referring to FIG. 2, the battery pack 200 includes a battery cell stack 210 configured to have a structure in which a plurality of pouch-shaped battery cells 211 is stacked so as to be in tight contact with each other; a heating member 220 disposed at a portion of the outer surface of the battery cell stack 210 so as to be attached thereto; a temperature sensor 240 connected to each of the battery cells 211; and a battery pack case 230 configured to receive the battery cell stack 210, the heating member 220, and the temperature sensors 240.

The battery cell stack 210 includes a left surface 210a of the battery cell stack, a lower surface 210b of the battery cell stack, a right surface 210c of the battery cell stack, and an upper surface 210d of the battery cell stack, as well as opposite end surfaces, from which electrode tabs 212 protrude.

The heating member 220 is configured to have an integrated structure including a first surface 221 of the heating member, a second surface 222 of the heating member, and a third surface 223 of the heating member. The first surface 221 of the heating member is disposed at the outer surface of the left surface 210a of the battery cell stack so as to be attached thereto, the second surface 222 of the heating member is disposed at the outer surface of the lower surface 210b of the battery cell stack so as to be attached thereto, and the third surface 223 of the heating member is disposed at the outer surface of the right surface 210c of the battery cell stack so as to be attached thereto.

That is, the heating member 220 is disposed at three outer surfaces of the battery cell stack constituted by the left surface 210a of the battery cell stack, the lower surface 210b of the battery cell stack, and the right surface 210c of the battery cell stack so as to be attached thereto. Consequently, the contact area between the battery cell stack 210 and the heating member 220 may be increased.

In a concrete example, in the case in which the battery pack 200 is exposed to a low-temperature environment, the battery pack may exhibit temperature distribution in which the temperatures of the battery cells located at the outside parts of the battery cell stack 210 are lower than the temperatures of the battery cells located at the middle part of the battery cell stack 210.

However, in the case in which the heating member disposed at the left surface and the right surface of the battery cell stack as well as the lower surface of the battery cell stack so as to be attached thereto is used, as in the present invention, it is possible to directly heat the battery cells located at the outside parts of the battery cell stack, the temperatures of which are low, to thus increase the temperatures of the battery cells. Consequently, it is possible to reduce temperature deviation occurring depending on the positions of the battery cells.

Also, in the case of the battery pack including the heating member according to the present invention, the area of the heating member applied in the battery pack is increased, whereby it is possible to rapidly increase the temperature in the battery pack, to advantageously maintain the heated state of the battery pack, and to uniformly maintain the temperature in the battery pack. Consequently, temperature distribution of the battery cells in the battery pack may be uniform.

The battery pack according to the present invention is configured such that temperature deviation between the battery cells constituting the battery cell stack is reduced. Consequently, it is preferable that side surfaces 213 of reception portions of the pouch-shaped battery cells constituting the battery cell stack be disposed parallel to the ground in the state in which the reception portions are stacked so as to face each other.

In the state in which the battery cells are disposed as described above, the heating member is disposed at the left surface, the lower surface, and the right surface of the battery cell stack.

A first bent portion 227 is formed between the first surface 221 of the heating member and the second surface 222 of the heating member, and a second bent portion 228 is formed between the second surface 222 of the heating member and the third surface 223 of the heating member. A first battery cell 211 and a second battery cell 219 are located at the outermost ends of the battery cell stack. The third surface 223 of the heating member is located at the outer surface of the first battery cell 211, and the first surface 221 of the heating member is located at the outer surface of the second battery cell 219.

It is preferable that the area of the second surface 222 of the heating member be equal to the area of the lower surface 210b of the battery cell stack.

In addition, the height of each of the first surface 221 of the heating member and the third surface 223 of the heating member may be equal to or less than the height of a corresponding one of the left surface 210a and the right surface 210c of the battery cell stack, which face the first surface 221 of the heating member and the third surface 223 of the heating member, respectively. Specifically, the area of each of the first surface 221 of the heating member and the third surface 223 of the heating member may be 10% or more of the area of a corresponding one of the left surface 210a and the right surface 210c of the battery cell stack.

Alternatively, the area of each of the first surface 221 and the third surface 223 of the heating member may be 50% or more, specifically 50% to 100%, and more specifically 80% to 100%, of the area of a corresponding one of the left surface 210a and the right surface 210c of the battery cell stack.

In the case in which the area of each of the first surface of the heating member and the third surface of the heating member is less than 50% of the area of a corresponding one of the left surface and the right surface of the battery cell stack, it is difficult to achieve the object to reduce temperature deviation between the battery cells, which is undesirable. In the case in which the area of each of the first surface of the heating member and the third surface of the heating member is greater than 100% of the area of a corresponding one of the left surface and the right surface of the battery cell stack, the size of the heating member may be greater than the size of the battery pack case, which is also undesirable.

A heat generation method of the heating member is not particularly restricted. For example, energy from an external power source may be supplied to the heating member such that the heating member generates heat in order to heat the battery cells in the battery pack.

The heating member may include a metal resistance heating element or a nonmetal resistance heating element. For example, iron, nickel, nickel chromium, iron chromium, platinum, or an alloy of platinum and rhodium may be used as the material for the metal resistance heating element, and the operating temperature of the metal resistance heating element may be 1200° C. to 2500° C. under vacuum or in a hydrogen stream. Silicon carbide may be used as the material for the metal resistance heating element. Alternatively, sodium nitrate, potassium nitrate, calcium chloride, sodium chloride, potassium chloride, sodium carbide, and barium chloride may be used alone or in the form of a mixture as the material for the metal resistance heating element. Carbon may be used at a high temperature of 2500° C. to 3000° C. in an atmosphere of a gas other than oxidizing gas or under vacuum in the form of a bar or a tube.

The battery pack 200 includes a temperature sensor 240 configured to measure the temperature of each individual battery cell and to adjust the temperature of the heating member 220 in the case in which temperature deviation occurs. The temperature sensor 240 is attached to the outer surface of each individual battery cell. The battery pack may further include an adjustment member (not shown) configured to adjust the heat generation temperature of the heating member based on the temperature of each individual battery cell measured by the temperature sensor 240.

When temperature deviation between the temperatures of the battery cells located at the outside parts of the battery cell stack and the temperatures of the battery cells located at the middle part of the battery cell stack is large, therefore, the adjustment member may increase the temperature of the heating member in order to increase the temperatures of the battery cells located at the outside parts of the battery cell stack.

FIG. 3 is a perspective view showing a heating member according to a second embodiment of the present invention.

Referring to FIG. 3, the heating member 320 is configured to have an integrated structure including a first surface 321 of the heating member, a second surface 322 of the heating member, and a third surface 323 of the heating member, wherein each of the first surface 321 of the heating member and the third surface 323 of the heating member is concave inwards at opposite ends thereof. The heating member includes a first bent portion 371 and a second bent portion 371 that extend along a longitudinal dimension of the heating member, and the first and the third surfaces extend along a height dimension of the heating member away from the respective first and second bent portions. The first surface 321 of the heating member defines a first recessed portion 381 extending concavely into the first surface 321 along the longitudinal dimension such that respective lengths (e.g., lengths 1a, 1c, 1b) of the first surface 321 in the longitudinal dimension vary along the height dimension, and the third surface 323 of the heating member defines a second recessed portion 382 extending concavely into the third surface 323 along the longitudinal dimension such that respective lengths (e.g., lengths 3a, 3b, 3c) of the third surface 323 in the longitudinal dimension vary along the height dimension. The heating member is configured to generate heat using energy supplied from an external power source such that the generated heat is applied to the three outer surfaces of the battery cell stack from the first, second and third surfaces of the heating member other than the first and second recessed portions.

In general, the temperatures of a battery cell measured in the vicinity of electrode tabs thereof are higher than the temperatures of the battery cell measured in other portions thereof, and temperature deviation occurs even in each individual battery cell depending on position.

The heating member 320 is configured in a form in which the portion of each of the first surface 321 of the heating member and the third surface 323 of the heating member adjacent to a corresponding one of the electrode tabs is partially removed. Consequently, it is possible to minimize temperature deviation in each individual battery cell, and therefore it is possible to reduce a capacity reduction rate of each individual battery cell.

FIG. 4 is a perspective view showing a heating member according to a third embodiment of the present invention.

Referring to FIG. 4, the heating member 420 is configured to have an integrated structure including a first surface 421 of the heating member, a second surface 422 of the heating member, and a third surface 423 of the heating member, wherein each of the first surface 421 of the heating member and the third surface 423 of the heating member is shorter than the second surface 422 of the heating member in a longitudinal direction 'a' of each battery cell.

In the same manner as in the heating member 320 according to the second embodiment of the present invention shown in FIG. 3, the portions of the heating member 420 adjacent to the electrode tabs are partially removed. Consequently, it is possible to minimize temperature deviation in each individual battery cell, and therefore it is possible to prevent the occurrence of lifespan differences between individual battery cells.

FIG. 5 is a perspective view showing a heating member according to a fourth embodiment of the present invention.

Referring to FIG. 5, the heating member includes two separate heating members, namely a first heating member 520 and a second heating member 530.

The first heating member 520 and the second heating member 530 are disposed at the outer surface of the battery cell stack so as to be attached thereto while being located such that second surfaces 522 and 532 thereof face each other.

While the heights of the first surface and the third surface of each of the heating members 220, 320, and 420 according to the first to third embodiments of the present invention correspond to the height of the battery cell stack, the sum of the height of a first surface 521 of the first heating member 520 and the height of a first surface 531 of the second heating member 530 or the sum of the height of a third surface 523 of the first heating member 520 and the height of a third surface 533 of the second heating member 530 may correspond to the height of the battery cell stack.

Even in the case in which the heating member is constituted by the first heating member 520 and the second heating member 530, it is possible to improve the effect of increasing the temperature of the battery cell stack, since the heating member extends up to the upper surface of the battery cell stack. Furthermore, it is sufficient to add only a process of covering the battery cell stack with the second heating member 530 to a process of assembling the battery pack 200, whereby it is possible to prevent difficulty occurring in the assembly process.

FIG. 6 is a sectional view showing a heating member according to a fifth embodiment of the present invention.

Referring to FIG. 6, the heating member 620 is configured in a form in which a resistance heating element is received in an insulative pad. The insulative pad may include a first surface 631 formed so as to face the battery cell stack and a second surface 632 formed so as to face the battery pack case. The first surface 631 may be made of a material that exhibits high thermal conductivity, and the second surface 632 may be made of a material that exhibits high thermal insulation.

That is, it is preferable that the first surface formed so as to face the battery cell stack be made of a material that exhibits high thermal conductivity such that heat generated from the resistance heating element 633 in the insulative pad is rapidly transmitted to the battery cell stack without loss and that the second surface formed so as to face the battery pack case be made of a material that exhibits high thermal insulation such that heat generated from the resistance heating element 633 in the insulative pad is prevented from being discharged out of the battery pack.

Hereinafter, the present invention will be described with reference to the following example. This example is provided only for easier understanding of the present invention and should not be construed as limiting the scope of the present invention.

Comparative Example 12 pouch-shaped battery cells were prepared and disposed as in the battery cell stack of FIG. 1. Subsequently, a planar heating member like the heating member of FIG. 1 was attached to the lower surface of a battery cell stack, and the battery cell stack and the heating member were received in a battery pack case.

A temperature sensor was attached to each of the pouch-shaped battery cells in order to measure the temperature of each individual battery cell.

EXAMPLE 12 pouch-shaped battery cells were prepared and disposed as in the battery cell stack of FIG. 2. Subsequently, the heating member of FIG. 2 was attached to the lower surface, the left surface, and the right surface of a battery cell stack, and the battery cell stack and the heating member were received in a battery pack case.

A temperature sensor was attached to each of the pouch-shaped battery cells in order to measure the temperature of each individual battery cell.

Experimental Example

Battery packs manufactured according to Example and Comparative Example were received in a chamber at −30° C., the heating members were heated for 1 hour, and temperature distribution of the battery cells was measured. Temperature distribution of the battery cells of Example is shown in FIG. 7, and temperature distribution of the battery cells of Comparative Example is shown in FIG. 8.

Referring to FIGS. 7 and 8, the numbers on the horizontal axis are the numbers of the battery cells constituting the battery cell stack assigned in order in one direction.

The graph of FIG. 7 shows that the temperature of battery cell #6 is the highest. The graph of FIG. 8 shows that the temperature of battery cell #7 is the highest, the temperatures of the battery cells located at the middle part of the battery cell stack are high, and the temperatures of battery cell #1 and battery cell #12, which are located at opposite ends of the battery cell stack, are the lowest.

FIG. 7 shows that temperature deviation between the 12 battery cells is not large and that the temperature of battery cell #6, which is the highest, is about 1.3 times the temperature of battery cell #3, which is the lowest. In contrast, FIG. 8 shows that the temperature of battery cell #7 is about 5.5 times the temperature of battery cell #1 and about 11 times the temperature of battery cell #12.

As described above, it can be seen that temperature deviation between the battery cells of Comparative Example is large, whereas temperature deviation between the battery cells of Example is small.

In the battery pack according to the present invention, therefore, the occurrence of lifespan differences between the battery cells is prevented, whereby it is possible to provide a high-efficiency, long-lifespan battery pack.

As described above, the battery pack according to the present invention is capable of reducing temperature deviation between the battery cells. Consequently, it is preferable that the battery pack be mounted in a device used in an area having a sub-zero temperature or a device such as a refrigerator so as to be used as a power source of the device.

Those skilled in the art to which the present invention pertains will appreciate that various applications and modifications are possible within the category of the present invention based on the above description.

DESCRIPTION OF REFERENCE SYMBOLS

100, 200: Battery packs
110, 210: Battery cell stacks
111, 211, 219: Battery cells
212: Electrode tab
120, 220, 320, 420, 520, 530, 620: Heating members
130, 230: Battery pack cases
210*a*: Left surface of battery cell stack
210*b*: Lower surface of battery cell stack
210*c*: Right surface of battery cell stack
210*d*: Upper surface of battery cell stack
213: Side surface of reception portion
221, 321, 421, 521, 531: First surfaces of heating members
222, 322, 422, 522, 532: Second surfaces of heating members
223, 323, 423, 523, 533: Third surfaces of heating members
227: First bent portion
228: Second bent portion
240: Temperature sensor
a: Longitudinal direction of battery cell
631: First surface facing battery cell stack
632: Second surface facing battery pack case
633: Resistance heating element

INDUSTRIAL APPLICABILITY

As is apparent from the above description, a battery pack according to the present invention uses a heating member disposed on three outer surfaces of a battery cell stack so as to be attached thereto in order to wrap the outer surfaces of the battery cell stack. As a result, the area of the heating member outside the battery cell stack is increased, whereby it is possible to considerably reduce temperature deviation between battery cells constituting the battery cell stack.

In addition, the heating member is disposed so as not to be in direct contact with the portions of each individual battery cell at which electrode tabs are disposed, the temperatures of which are relatively high, whereby it is possible to minimize temperature deviation in each individual battery cell.

In addition, a material that exhibits high thermal insulation is applied to the outside of the heating member, and a material that exhibits high thermal conductivity is applied to the inside of the heating member. Consequently, it is possible to increase the temperature in the battery pack and to inhibit the increased temperature in the battery pack from being discharged out of the battery pack.

The invention claimed is:

1. A battery pack comprising:
a battery cell stack including a plurality of battery cells stacked in contact with each other;

a heating member disposed along and in contact with three outer surfaces of the battery cell stack; and a battery pack case configured to receive the battery cell stack and the heating member therein, wherein the heating member has a unitary structure including a first surface, a second surface, and a third surface, wherein a first bent portion is defined between the first surface and the second surface of the heating member, and a second bent portion is defined between the second surface and the third surface of the heating member, the first and the second bent portions extending along a longitudinal dimension of the heating member, and the first and the third surfaces extending along a height dimension of the heating member away from the respective first and second bent portions, wherein the first surface of the heating member defines a first recessed portion extending concavely into the first surface along the longitudinal dimension such that respective lengths of the first surface in the longitudinal dimension vary along the height dimension, and the third surface of the heating member defines a second recessed portion extending concavely into the third surface along the longitudinal dimension such that respective lengths of the third surface in the longitudinal dimension vary along the height dimension, wherein at least one of the first and the second recessed portions is adjacent to a corresponding electrode tab of the battery cell stack, wherein the heating member is configured to generate heat using energy supplied from an external power source such that the generated heat is applied to the three outer surfaces of the battery cell stack from the first, second and third surfaces of the heating member other than the first and second recessed portions, wherein the heating member comprises a metal or non-metal resistance heating element, wherein the heating member includes the metal or non-metal resistance heating element received in an insulative pad, and the insulative pad comprises a first surface arranged so as to face the battery cell stack and a second surface arranged so as to face the battery pack case, the first surface of the insulative pad is made of a first material that exhibits higher thermal conductivity than that of a second material, and the second surface of the insulative pad is made of the second material that exhibits higher thermal insulation than that of the first material.

2. The battery pack according to claim 1, wherein the second surface of the heating member extends between and connects the first surface and the third surface of the heating member, the first and third surfaces extending transverse to the second surface, and wherein the battery cell stack is arranged such that side surfaces of each of the plurality of battery cells along a thickness direction thereof are disposed parallel to the second surface of the heating member.

3. The battery pack according to claim 1, wherein the first surface and the third surface are each located along an outer surface of a first battery cell and a second battery cell of the plurality of battery cells, respectively, the first and second battery cells of the plurality of battery cells being located at opposing outermost ends of the battery cell stack.

4. The battery pack according to claim 1, wherein an area of the second surface of the heating member is equal to an area of a first one of the outer surfaces of the battery cell stack, the first outer surface facing the second surface.

5. The battery pack according to claim 1, wherein
a respective temperature sensor is connected to each of the battery cells.

6. A device comprising the battery pack according to claim 1 as a power source.

* * * * *